(12) United States Patent
Hart

(10) Patent No.: US 11,367,861 B2
(45) Date of Patent: Jun. 21, 2022

(54) ACCELERATED FORMATION OF INTERCALATION COMPOUNDS WITHIN CAPACITOR OR BATTERY CELL NEGATIVE ELECTRODE

(71) Applicant: LICAP TECHNOLOGIES, INC., Sacramento, CA (US)

(72) Inventor: Jonathan Hart, Sacramento, CA (US)

(73) Assignee: LiCap Technologies, Inc., Sacramento, CA (US)

( * ) Notice: Subject to any disclaimer, the term of this patent is extended or adjusted under 35 U.S.C. 154(b) by 335 days.

(21) Appl. No.: 16/843,547

(22) Filed: Apr. 8, 2020

(65) Prior Publication Data
US 2021/0320289 A1    Oct. 14, 2021

(51) Int. Cl.
| | | |
|---|---|---|
| *H01M 4/04* | (2006.01) | |
| *H01M 10/0525* | (2010.01) | |
| *H01M 4/139* | (2010.01) | |
| *H01G 11/86* | (2013.01) | |
| *H01G 11/62* | (2013.01) | |
| *H01G 11/50* | (2013.01) | |
| *G06N 20/00* | (2019.01) | |
| *G06N 5/04* | (2006.01) | |
| *H01G 11/06* | (2013.01) | |
| *H02J 7/00* | (2006.01) | |
| *H01M 4/02* | (2006.01) | |

(52) U.S. Cl.
CPC ............ *H01M 4/0447* (2013.01); *G06N 5/04* (2013.01); *G06N 20/00* (2019.01); *H01G 11/06* (2013.01); *H01G 11/50* (2013.01); *H01G 11/62* (2013.01); *H01G 11/86* (2013.01); *H01M 4/139* (2013.01); *H01M 10/0525* (2013.01); *H01M 2004/027* (2013.01); *H02J 7/007* (2013.01)

(58) Field of Classification Search
CPC ............... H01M 4/0447; H01M 4/139; H01M 10/0525; H01M 2004/027; H01G 11/06; H01G 11/50; H01G 11/62; H01G 11/86
See application file for complete search history.

(56) References Cited

U.S. PATENT DOCUMENTS

| | | | |
|---|---|---|---|
| 9,166,222 B2 | 10/2015 | Amiruddin et al. | |
| 9,928,969 B2 | 3/2018 | Gadkaree et al. | |
| 10,522,819 B2 | 12/2019 | Wietelmann et al. | |
| 10,559,862 B2 | 2/2020 | Antonopoulos | |
| 2014/0170478 A1* | 6/2014 | Liao | H01M 50/46 429/207 |
| 2016/0248077 A1* | 8/2016 | Momo | H01M 10/0525 |

* cited by examiner

*Primary Examiner* — Stewart A Fraser
(74) *Attorney, Agent, or Firm* — Stetina Brunda Garred & Brucker

(57) ABSTRACT

A manufacturing method for the formation of lithium, potassium, and/or calcium intercalation compounds on a negative electrode for a battery or capacitor cell is disclosed. The battery or capacitor cell is constructed with a negative electrode that may contain graphitic carbon, silicon, metal oxide, and/or complex metal oxides and a lithium, potassium, and/or calcium ion source supplemental electrode. After construction of the cell, a method of controlled electrical contact is applied between the positive electrode and negative electrode to accelerate and regulate a process of ion exchange between the supplemental metal ion source electrode and the negative electrode which results in the formation of intercalation compounds within the negative electrode, and produces a battery or capacitor with a higher working voltage, high cycle life, and long DC life.

21 Claims, 5 Drawing Sheets

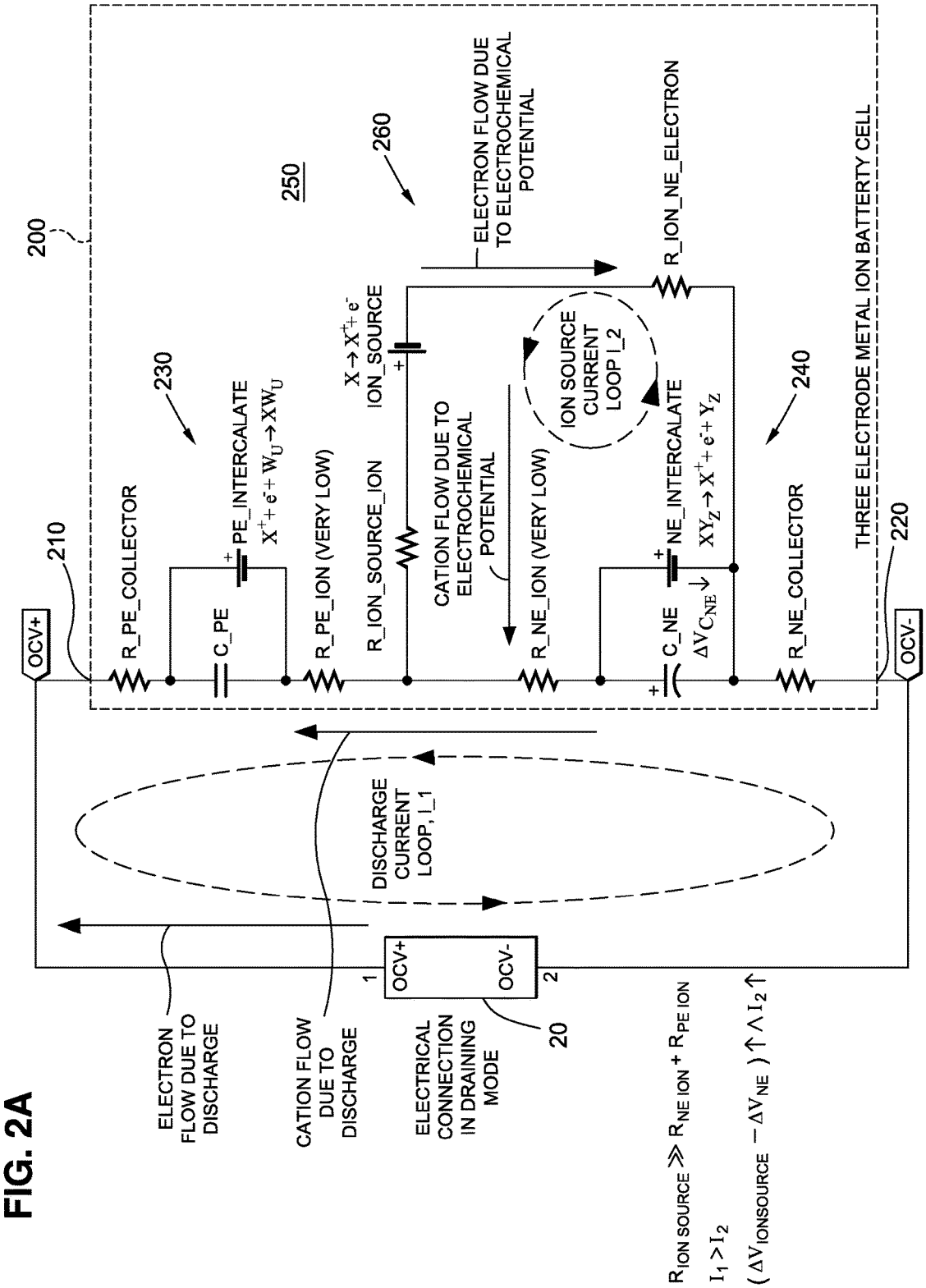

ACCELERATED FORMATION OF INTERCALATION COMPOUNDS WITHIN CAPACITOR OR BATTERY CELL NEGATIVE ELECTRODE

CROSS-REFERENCE TO RELATED APPLICATIONS

Not Applicable

STATEMENT RE: FEDERALLY SPONSORED RESEARCH/DEVELOPMENT

Not Applicable

BACKGROUND

The use of negative electrodes containing lithium intercalation compounds for the construction of lithium ion batteries improves battery specific capacity at long cycling. The lithium intercalation compounds within the negative electrodes can result from various production processes preceding cell assembly or by the use of a supplemental lithium source electrode subsequent to cell assembly. The use of lithium intercalation compounds within negative electrodes can also be employed in electric double-layer capacitor (EDLC) manufacture to produce lithium ion capacitors with high energy storage capacity and cycle life.

When negative electrodes containing lithium intercalation compounds are constructed outside of the cell, it is typically referred to as pre-doping. See, for example, U.S. Pat. Nos. 9,928,969 and 10,522,819. Such manufacturing methods can involve the use of especially hazardous lithium metal powders and require special handling throughout the cell construction process, or methods of stabilizing or passivizing the lithium containing powder have to be employed. Furthermore, pre-doping reactions are rapid and exothermic, which results in the simultaneous production of various secondary compounds which are harmful in that they increase reduction of cell specific capacity during cycling or simply add inert mass to the completed cell which decreases the maximum energy density.

Alternatively, when negative electrodes containing lithium intercalation compounds are manufactured within the cells, it can interfere with desirable cell qualities such as specific capacity and equivalent series resistance. Such methods may also be very slow processes which can result in lingering highly reactive lithium metal or metal compounds, increasing the likelihood of runaway exothermic reactions within the cells in the event of excessive heating or a breach of the cell containers. The speed of formation may be increased by the application of electrical power between a lithium ion source supplemental electrode and the negative electrode. Such methods reportedly assist in the formation of and improve upon the negative electrode SEI layer. However, there are drawbacks to such methods. For example, for optimal results, the lithium ion source and the negative electrode must be already submerged in the electrolyte, which means that for the process to be optimal it must either take place entirely in a contaminant free environment or, alternatively, the cell must be already sealed with an accessible third terminal. Applying the method in a contaminant free environment, optimally an inert atmosphere glove box, requires the use of special machinery to connect the voltage, current, or AC power sources between the negative electrode and the lithium ion source electrode. The drawbacks of constructing a sealed three terminal cell include either additional processing steps in which the cell is unsealed and the third terminal is removed to produce a final sealed two terminal cell, which necessarily increases production costs, or it results in a cell with an inactive third terminal that necessarily increases manufacturing costs and reduces the maximum attainable energy density of the cell.

BRIEF SUMMARY

The present disclosure contemplates various methods and devices for overcoming the above drawbacks accompanying the related art. One aspect of the embodiments of the present disclosure is a method of forming a negative electrode of an energy storage device. The method may include providing an energy storage device cell, the cell including a negative electrode, a positive electrode, and a supplemental ion source electrically connected to the negative electrode. A value of an energy storage capacity of the cell may be defined that is indicative of the negative electrode being fully formed as a result of intercalation in the negative electrode of an ion provided by the supplemental ion source. The method may include filling the cell with an organic electrolyte containing a salt composed of the ion and, prior to the energy storage capacity of the cell reaching the defined value, discharging electric current from the positive electrode to the negative electrode. Thereafter, the electric current may be reversed to flow from the negative electrode to the positive electrode.

The energy storage device may be a battery. The defined value may be a capacity measurement value of the cell.

The energy storage device may be a capacitor. The defined value may be a capacitance measurement value of the cell.

The method may include repeating the discharging and the reversing of the electric current.

The method may include determining one or more parameters of the discharging and/or reversing from one or more inputs selected from the group consisting of electric potential of the cell, current output by the cell, equivalent series resistance of the cell, temperature of the cell, capacity of the cell, and capacitance of the cell. The one or more parameters may include at least one parameter selected from the group consisting of a target open cell voltage, a discharge current, a charge current, a discharge time, a charge time, a number of discharge cycles, and a number of charge cycles. The one or more parameters may define a pattern of multiple discharge and/or charge cycles.

The method may include controlling the discharging and/or reversing of the electric current according to a machine learning algorithm. The machine learning algorithm may determine one or more parameters of the discharging and/or reversing from one or more inputs selected from the group consisting of electric potential of the cell, current output by the cell, equivalent series resistance of the cell, temperature of the cell, capacity of the cell, and capacitance of the cell. The one or more parameters may include at least one parameter selected from the group consisting of a target open cell voltage, a discharge current, a charge current, a discharge time, a charge time, a number of discharge cycles, and a number of charge cycles. The one or more parameters may define a pattern of multiple discharge and/or charge cycles.

The discharging may be performed at least in part while an open cell voltage of the cell is below a rated minimum. The discharging may be performed before any charging of the cell. The method may include charging the cell to a maximum rated cell voltage after the discharging and the reversing of the electric current.

The ion provided by the supplemental ion source may include a lithium ion, a potassium ion, and/or a calcium ion.

Another aspect of the embodiments of the present disclosure is a battery comprising a negative electrode formed by the above method.

Another aspect of the embodiments of the present disclosure is a capacitor comprising a negative electrode formed by the above method.

Another aspect of the embodiments of the present disclosure is a method of forming a negative electrode of a lithium ion battery. The method may include providing a lithium ion battery cell, the cell including a negative electrode, a positive electrode, and a supplemental lithium ion source electrically connected to the negative electrode, filling the cell with an organic electrolyte containing a lithium salt, and, prior to a capacity of the cell reaching a value indicative of the negative electrode being fully formed as a result of lithium intercalation, discharging electric current from the positive electrode to the negative electrode. Thereafter, the electric current may be reversed to flow from the negative electrode to the positive electrode.

Another aspect of the embodiments of the present disclosure is a method of forming a negative electrode of a lithium ion capacitor. The method may include providing a lithium ion capacitor cell, the cell including a negative electrode, a positive electrode, and a supplemental lithium ion source electrically connected to the negative electrode, filling the cell with an organic electrolyte containing a lithium salt, and, prior to a capacitance of the cell reaching a value indicative of the negative electrode being fully formed as a result of lithium intercalation, discharging electric current from the positive electrode to the negative electrode. Thereafter, the electric current may be reversed to flow from the negative electrode to the positive electrode.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 2A is a schematic diagram of a battery cell and a controlled electrical connection between positive and negative terminals thereof during a discharge cycle of a formation process according to an embodiment of the present disclosure;

DETAILED DESCRIPTION

Figure 1A:
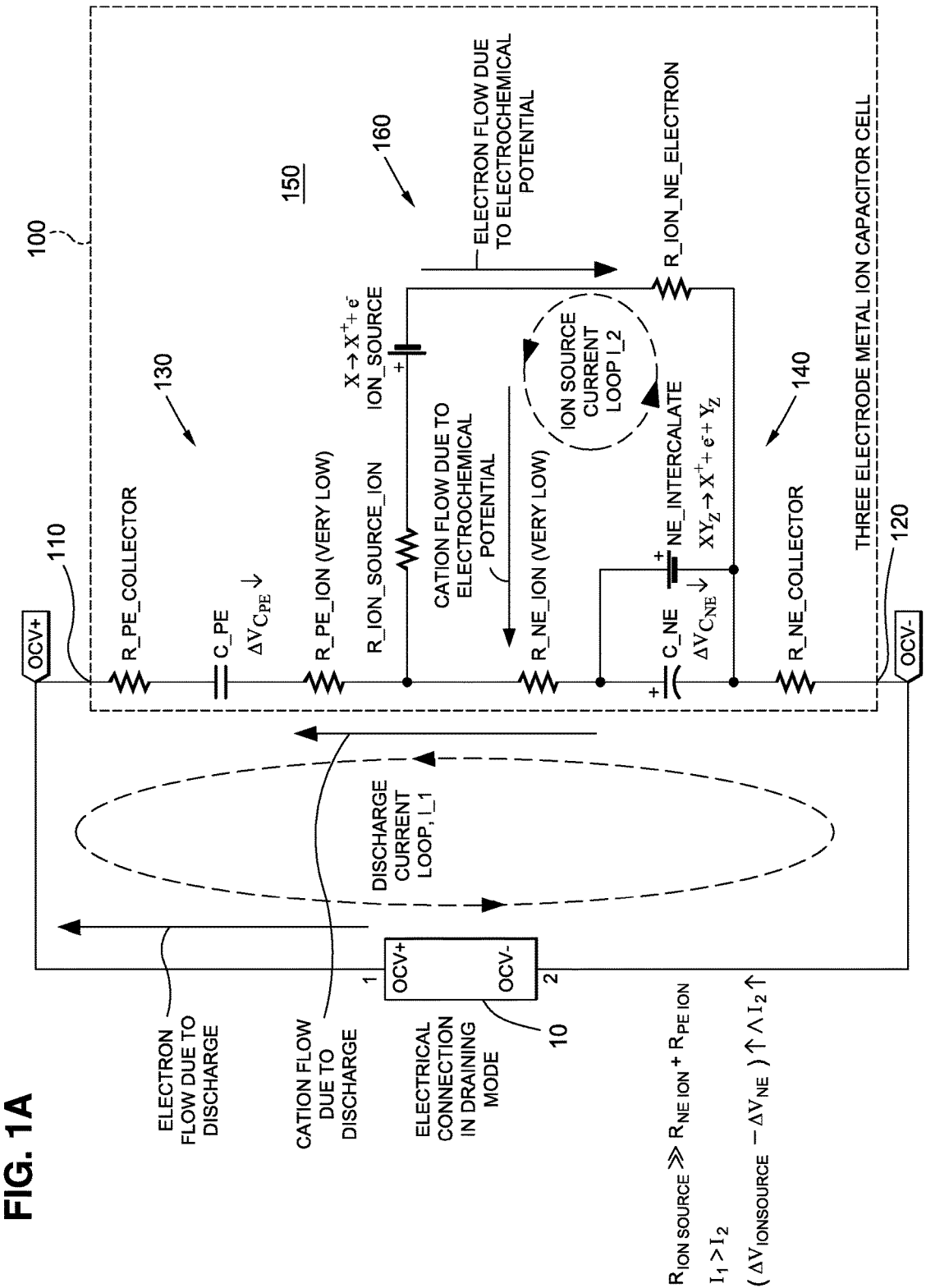
FIG. 1A is a schematic diagram of a capacitor cell and a controlled electrical connection between positive and negative terminals thereof during a discharge cycle of a formation process according to an embodiment of the present disclosure.

The present disclosure encompasses various embodiments of methods for forming a negative electrode of an energy storage device such as a battery or capacitor, as well as the resulting batteries or capacitors produced thereby. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that relational terms such as first and second and the like are used solely to distinguish one from another entity without necessarily requiring or implying any actual such relationship in order between such entities.

A lithium, potassium, and/or calcium ion capacitor cell 100 (see FIGS. 1A and 1B) or battery cell 200 (see FIGS. 2A and 2B) can be constructed by combining a high surface area positive electrode 130, 230 with a high surface area negative electrode 140, 240 made from an intercalable material such as graphitic carbon, silicon based film, metal oxide, or complex metal oxide separated by a separator, and immersed within an electrolyte 150, 250 containing a lithium, potassium, and/or calcium salt which results in available relevant ions. A supplemental lithium, potassium, and/or calcium metal ion source 160, 260 may be electrically connected to the negative electrode 140, 240. An electrochemical potential may exist between the supplemental ion source 160, 260 and the negative electrode 140, 240 which, depending on the degree and type of electrical connection between the supplemental ion source 160, 260 and the negative electrode 140, 240, can transform the intercalable material of the negative electrode 140, 240 into lithium, potassium, and/or calcium intercalation compounds over time.

The degree of electrical connection between the supplemental ion source 160, 260 and the negative electrode 140, 240 may be of incredibly high importance to the rate at which the negative electrode 140, 240 is transformed into lithium, potassium, and/or calcium intercalation compounds. The electrical connection may be thought of as consisting of two parts which are effectively connected in series. The first part of the electrical connection is the electron pathway, and the second part of the electrical connection is the ion pathway. The electron pathway may consist of a conductor of some sort connected between the negative electrode 140, 240 and the supplemental ion source 160, 260, and this connection is best and easily constructed to have a very low impedance. The ion pathway, however, is more difficult to construct in a way which has a very low impedance. This is because, in order to form a low equivalent series resistance (ESR) capacitor or ion battery with high specific capacity, the surface area of the positive electrode 130, 230 and the surface area of the negative electrode 140, 240 must be very high and the distance between the two must be very low, and trying to form the same low resistance, high capacity construction between the negative electrode 140, 240 and the supplemental lithium, potassium, and/or calcium ion source 160, 260 is a competing goal such that a low resistance between the negative electrode 140, 240 and the supplemental ion source 160, 260 would inevitably come at the cost of a higher cell ESR and lower specific capacity, which of course is undesirable. Thus, the effective reduction in the impedance of the ion pathway between the supplemental ion source 160, 260 and the negative electrode 140, 240 is of key importance to the acceleration and regulation of the formation of lithium, potassium, and/or calcium intercalation compounds, but such reduction by modifying the physical arrangement of the cell components comes at the cost of higher cell ESR and lower specific capacity.

Figure 1B:
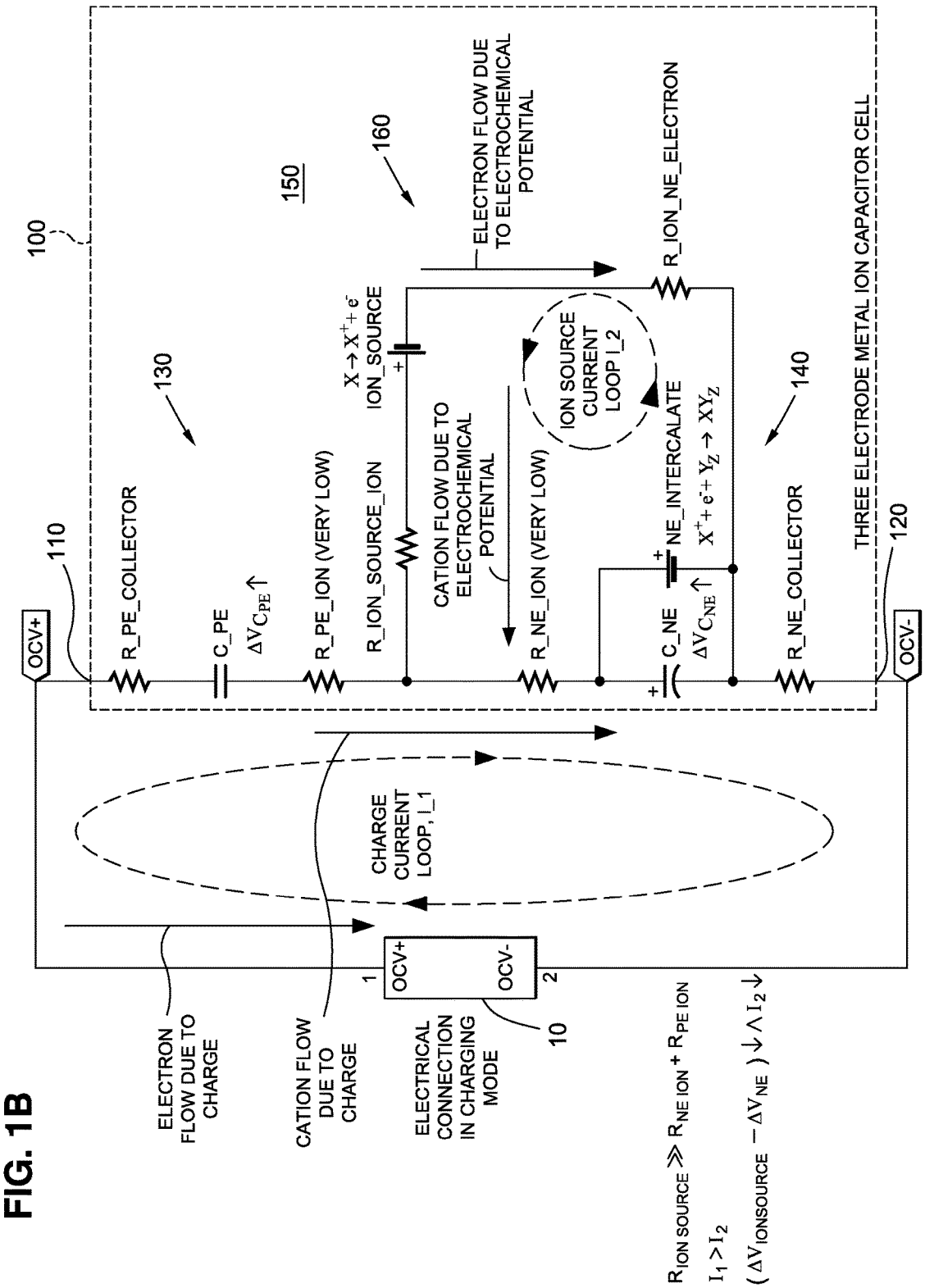
FIG. 1B is a schematic diagram of the capacitor cell and the controlled electrical connection during a charge cycle of the formation process.
Figure 2B:
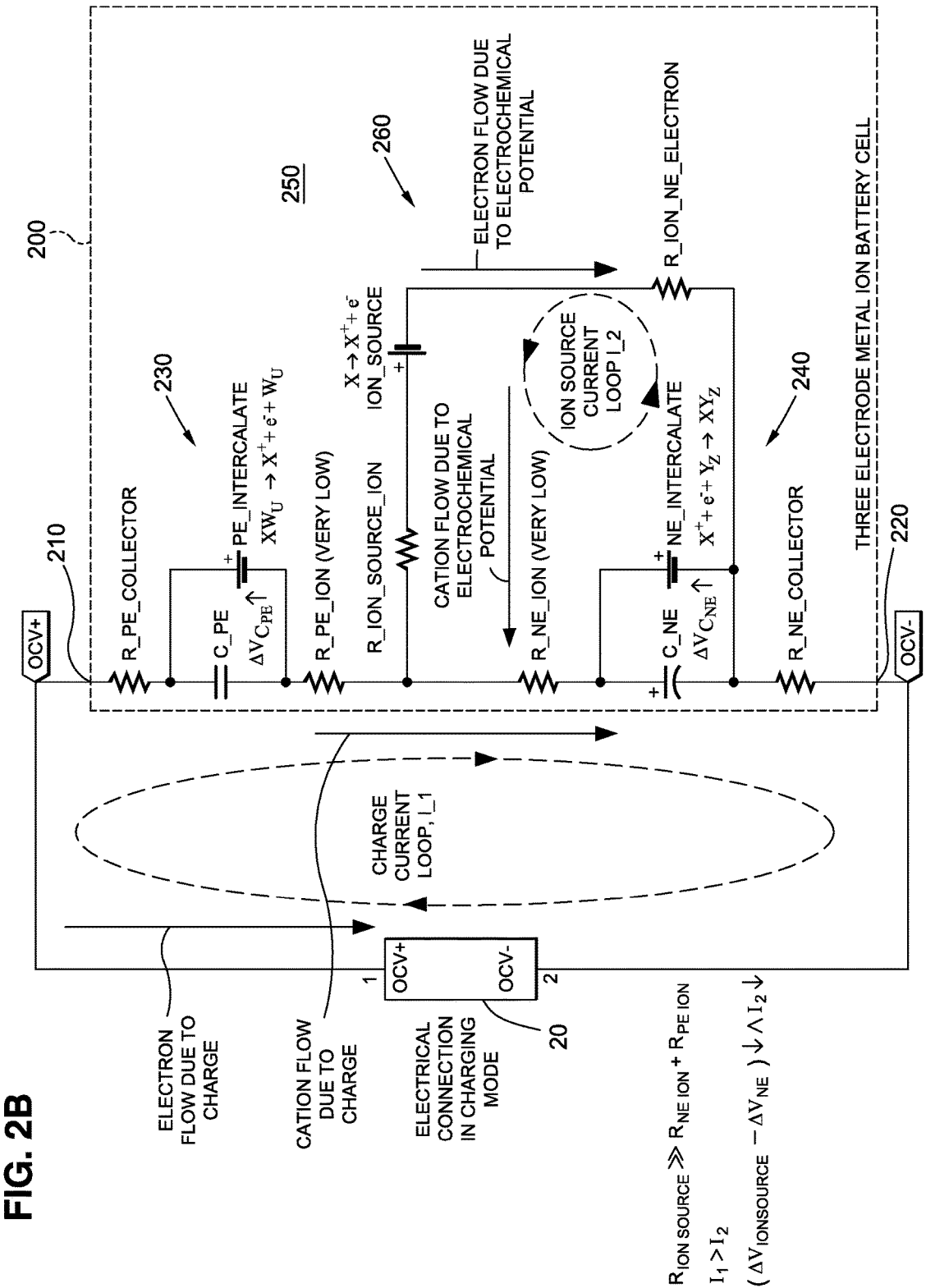
FIG. 2B is a schematic diagram of the battery cell and the controlled electrical connection during a charge cycle of the formation process.

The disclosed methods provide for the accelerated formation of lithium, potassium, and/or calcium intercalation compounds within a low ESR, high capacity lithium, potassium, and/or calcium ion capacitor or battery cell such as the capacitor cell 100 shown in FIGS. 1A and 1B or the battery cell 200 shown in FIGS. 2A and 2B. After cell construction, a passive or controlled electrical connection 10, 20 is provided between the positive electrode 130, 230 and the negative electrode 140, 240 of the cell 100, 200 via the positive terminal 110, 210 and the negative terminal 120, 220. The electrical connection 10, 20 can consist of various passive elements such as electrical impedances or active elements like a voltage source, current source, or diode, any or all of which may be capable of being switched or otherwise controlled via the use of switches, relays, or transistors. In order to accelerate the formation of intercalation compounds, one or more drains or discharges of electric current from the positive electrode 130, 230 to the negative electrode 140, 240 may be performed using the electrical connection 10, 20. This may be followed by one or more periods of charging or reversals of drain current, such that electric current flows from the negative electrode 140, 240 to the positive electrode 130, 230. In this way, the formation process may leverage the typically low ion impedance between the positive electrode 130, 230 and the negative electrode 140, 240 to produce an effect similar to lowering the ion impedance between the supplemental lithium, potassium, and/or calcium ion source 160, 260 and the negative electrode 140, 240. This effect is produced by causing lithium, potassium, and/or calcium ions to flow from the ion source 160, 260 to the positive electrode 130, 230, and then from the positive electrode 130, 230 to the negative electrode 140, 240 to form intercalation compounds.

FIG. 1A is a schematic diagram of a capacitor cell 100 and a controlled electrical connection 10 between positive and negative terminals 110, 120 thereof during a discharge cycle of a formation process according to an embodiment of the present disclosure. FIG. 1B is a schematic diagram of the capacitor cell 100 and the controlled electrical connection 10 during a charge cycle of the formation process. Referring to FIGS. 1A and 1B, the positive electrode 130 of the capacitor cell 100 may define an electrical impedance R_PE_COLLECTOR between the positive terminal 110 and an active surface of the positive electrode 130, an electrical capacitance C_PE associated with an interface layer between the positive electrode 130 and the electrolyte 150, and an electrical impedance R_PE_ION to ion flow in the electrolyte 150 in the volume surrounding the positive electrode 130. Likewise, the negative electrode 140 of the capacitor cell 100 may define an electrical impedance R_NE_COLLECTOR between the negative terminal 120 and an active surface of the negative electrode 140, an electrical capacitance C_NE associated with an interface layer between the negative electrode 140 and the electrolyte 150, and an electrical impedance R_NE_ION to ion flow in the electrolyte 150 in the volume surrounding the negative electrode 140. Owing to the construction of the capacitor cell 100, both the electrical impedance R_PE_ION and the electrical impedance R_NE_ION may be very low, resulting in low ESR. The electrochemical potential NE_INTERCALATE of lithium, potassium, and/or calcium intercalation compounds forming on the negative electrode 140 is represented in FIGS. 1A and 1B with a symbol orientation denoting positive charge current flowing out from a positive terminal of the symbol as lithium, potassium, and/or calcium ions and electrons are produced by the reaction with the active surface of the negative electrode 140. Conversely, if positive charge current flows into the positive terminal of the symbol, then lithium, potassium, and/or calcium ions and electrons are consumed in the formation of intercalation compounds.

The supplemental ion source 160 of the capacitor cell 100 may define an electrical impedance R_ION_NE_ELECTRON between an active surface of the supplemental ion source 160 and the active surface of the negative electrode 140 and an electrical impedance R_ION_SOURCE_ION to ion flow in the electrolyte 150 in the volume surrounding the supplemental ion source 160. The impedance R_ION_NE_ELECTRON may be very low and may represent the electron pathway described above, advantageously consisting of a conductor connected between the negative electrode 140 and the supplemental ion source 160. The electrochemical potential ION_SOURCE of the supplemental ion source 160 is represented in FIGS. 1A and 1B with a symbol orientation denoting positive charge current flowing out from a positive terminal of the symbol as lithium, potassium, and/or calcium ions and electrons are produced by the reaction with the active surface of the supplemental ion source 160. Conversely, if positive charge current flows into the positive terminal of the symbol, then lithium, potassium, and/or calcium ions and electrons are bound or absorbed by the supplemental ion source 160.

FIG. 2A is a schematic diagram of a battery cell 200 and a controlled electrical connection 20 between positive and negative terminals 210, 220 thereof during a discharge cycle of a formation process according to an embodiment of the present disclosure. FIG. 2B is a schematic diagram of the battery cell 200 and the controlled electrical connection 20 during a charge cycle of the formation process. Referring to FIGS. 2A and 2B, the positive electrode 230 of the battery cell 200 may define an electrical impedance R_PE_COLLECTOR between the positive terminal 210 and an active surface of the positive electrode 230, an electrical capacitance C_PE associated with an interface layer between the positive electrode 230 and the electrolyte 250, and an electrical impedance R_PE_ION to ion flow in the electrolyte 250 in the volume surrounding the positive electrode 230. Unlike in the case of the capacitor cell 100, the positive electrode 230 of the battery cell 200 may further define an electrochemical potential PE_INTERCALATE of lithium, potassium, and/or calcium intercalation compounds forming on the positive electrode 230. This is represented in FIGS. 2A and 2B with a symbol orientation denoting positive charge current flowing out from a positive terminal of the symbol as lithium, potassium, and/or calcium ions and electrons are consumed to form lithium, potassium, and/or calcium intercalation compounds on the positive electrode 230. Conversely, if positive charge current flows into the positive terminal of the symbol, then lithium, potassium, and/or calcium ions and electrons are produced.

Similarly, the negative electrode 240 of the battery cell 200 may define an electrical impedance R_NE_COLLECTOR between the negative terminal 220 and an active surface of the negative electrode 240, an electrical capacitance C_NE associated with an interface layer between the negative electrode 240 and the electrolyte 250, and an electrical impedance R_NE_ION to ion flow in the electrolyte 250 in the volume surrounding the negative electrode 240. Owing to the construction of the battery cell 200, as in the case of the capacitor cell 100, both the electrical impedance R_PE_ION and the electrical impedance R_NE_ION may be very low, resulting in low ESR. The electrochemical potential NE_INTERCALATE of lithium, potassium, and/or calcium intercalation compounds forming on the negative electrode 240 is represented in FIGS. 2A and 2B with a symbol orientation denoting positive charge current flowing out from a positive terminal of the symbol as lithium, potassium, and/or calcium ions and electrons are produced by the reaction with the active surface of the negative electrode 240. Conversely, if positive charge current flows into the positive terminal of the symbol, then lithium, potassium, and/or calcium ions and electrons are consumed in the formation of intercalation compounds.

The supplemental ion source 260 of the battery cell 200 may define an electrical impedance R_ION_NE_ELECTRON between an active surface of the supplemental ion source 260 and the active surface of the negative electrode 240 and an electrical impedance R_ION_SOURCE_ION to ion flow in the electrolyte 250 in the volume surrounding the supplemental ion source 260. The impedance R_ION_NE_ELECTRON may be very low and may represent the electron pathway described above, advantageously consisting of a conductor connected between the negative electrode 240 and the supplemental ion source 260. As in the case of the capacitor cell 100, the electrochemical potential ION_SOURCE of the supplemental ion source 260 in the battery cell 200 of FIGS. 2A and 2B is represented with a symbol orientation denoting positive charge current flowing out from a positive terminal of the symbol as lithium, potassium, and/or calcium ions and electrons are produced by the reaction with the active surface of the supplemental ion source 260. Conversely, if positive charge current flows into the positive terminal of the symbol, then lithium, potassium, and/or calcium ions and electrons are bound or absorbed by the supplemental ion source 260.

Figure 3:
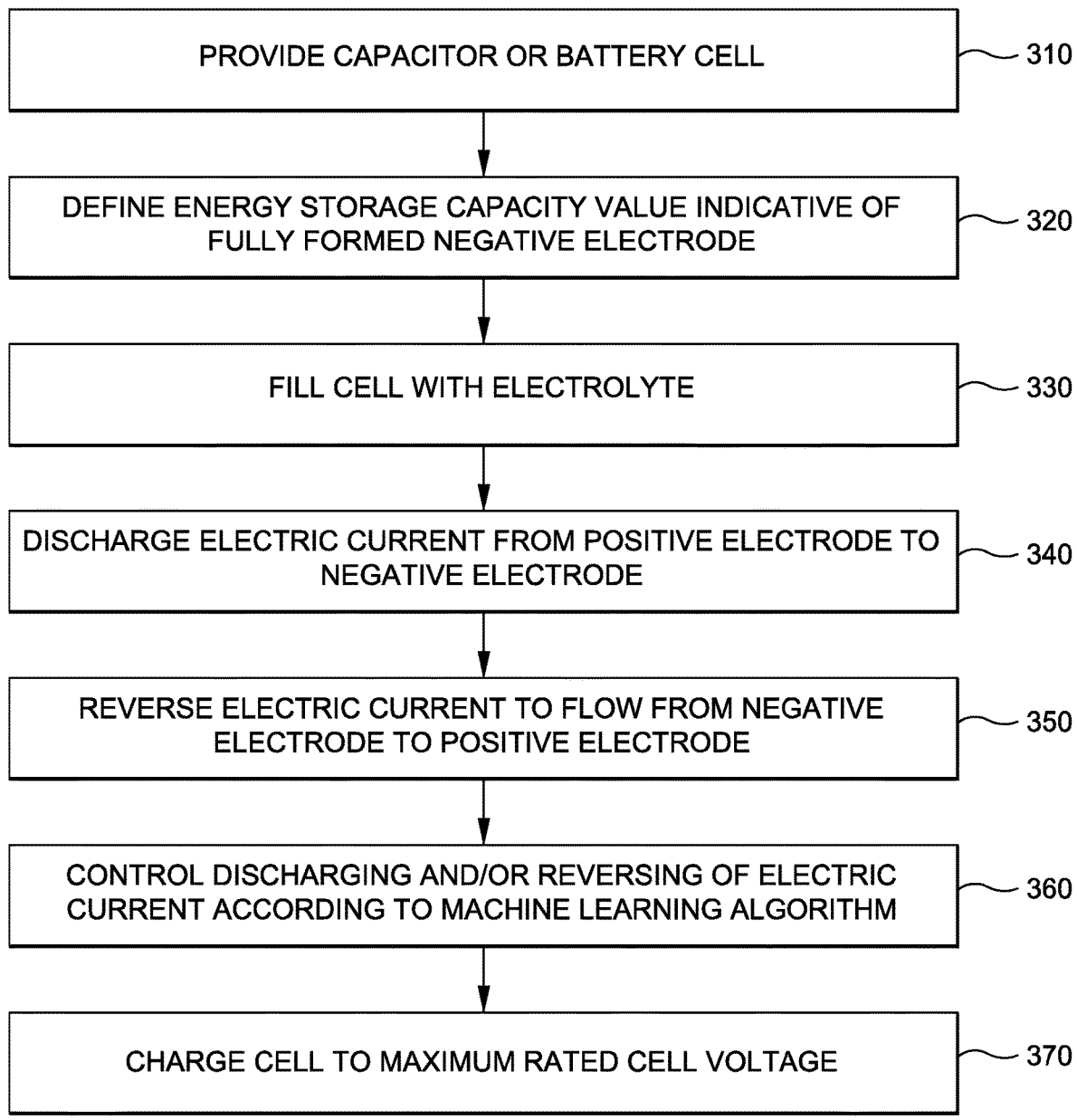
FIG. 3 shows an operational flow for accelerated formation of a negative electrode of a capacitor or battery cell according to an embodiment of the present disclosure.

FIG. 3 shows an operational flow for accelerated formation of a negative electrode 140, 240 of a capacitor or battery cell 100, 200 according to an embodiment of the present disclosure. The operational flow may begin with providing an energy storage device cell such as a capacitor cell 100 or a battery cell 200 as shown schematically in FIGS. 1A, 1B, 2A, and 2B (step 310). The energy storage device cell 100, 200 may include a negative electrode 140, 240, a positive electrode 130, 230, and a supplemental ion source 160, 260 connected to the negative electrode 140, 240. The positive electrode 130, 230 may be made of, for example, conductive metal with a high surface area coating containing graphite, carbon, activated carbon, hard carbon, coconut shell carbon, metal oxide, clay, binder polymers, carbon black, carbon nanotubes, and/or silicon-based materials. In the case of the battery cell 200, the positive electrode 230 may, in addition to the above, be made of an intercalable complex metal oxide pre-loaded with some percentage of the active lithium, potassium, and/or calcium ion. The negative electrode 140, 240 may be made of, for example, graphitic carbon, a silicon-based material, a metal oxide such as manganese oxide, or a complex metal oxide such as lithium manganese oxide. The positive electrode 130, 230 and negative electrode 140, 240 may be constructed to have high surface area and arranged to be separated by only a small distance (e.g. rolled with a separator therebetween).

The supplemental ion source 160, 260 may be, for example, a lithium ion source, a potassium ion source, and/or a calcium ion source and may consist of an amount of the requisite element(s) in metallic form (e.g. a piece of lithium metal in the case of lithium ions), a large source of preformed intercalate compounds, or various sorts of alloys containing the requisite element(s), for example. The connection between the supplemental ion source 160, 260 and the negative electrode 140, 240 may be a low impedance connection as explained above. As one example, in addition to current collector tabs connecting the positive electrode 130, 230 to the positive terminal 110, 210 and the negative electrode 140, 240 to the negative terminal 120, 220, an extra internal tab may be provided as a low impedance connection between the supplemental ion source 160, 260 and the negative electrode 140, 240. As another example, a conductor such as a copper disk may be pressed against a scored current collector tab of the negative electrode 140, 240 (which may be coated with a silicon based film, for example), with the supplemental ion source 160, 260 being, for example, a lithium, potassium, and/or calcium metal foam deposited on the copper disk.

Depending on the size, layout, and materials of the capacitor or battery cell 100, 200, the finished product to be sold may be expected to exhibit some particular energy storage capacity value, which may be, for example, a capacitance measurement value (e.g. in Farads) in the case of the capacitor cell 100 or a capacity measurement value (e.g. in ampere hours) in the case of the battery cell 200. During the formation process of the negative electrode 140, 240, such value is not yet reached due to incomplete intercalation of the ions provided by the supplemental ion source 160, 260 in the negative electrode 140, 240. Thus, a value of the energy storage capacity of the cell 100, 200 may be defined that is indicative of the negative electrode 140, 240 being fully formed (step 320).

To begin the negative electrode formation process, the cell 100, 200 may be filled with an organic electrolyte 150, 250 containing a salt composed of the same ion(s) as is provided by the supplemental ion source (step 330). For example, in the case of a potassium ion source 160, 260, a potassium hexafluorophosphate salt (e.g. with a one molar concentration) may be dissolved in the electrolyte 150, 250. In the case of a lithium ion source 160, 260, a lithium salt such as lithium difluoro(oxalate)borate, lithium hexafluorophosphate, lithium tetrafluoroborate, or lithium perchlorate may be used. Solvents may include, for example, diethyl carbonate, dimethyl carbonate, or ethylene carbonate. Once the cell 100, 200 is filled with the electrolyte 150, 250, the open cell voltage (OCV) may have a natural tendency to rise as a result of the formation of lithium, potassium, and/or calcium intercalation compounds on the negative electrode 140, 240. In the case of the capacitor cell 100, the internal capacitor C_PE comprising the interface between the positive electrode 130 and the ion-containing electrolyte 150 has no potential across it at this point, and no lithium, potassium, and/or calcium ions present in the electrolyte 150 due to salt additives are particularly attracted to it. On the other hand, in the case of the battery cell 200, the internal capacitor C_PE may have an inherent electrochemical potential across it, representing a degree of electrochemical stress at the interface between the positive electrode 230 and the electrolyte 250, which may be limited to within a certain window during the disclosed formation process in order to prevent undesired, destructive reactions.

Once the cell 100, 200 has been filled with the electrolyte 150, 250, the supplemental ion source 160, 260 may gradually deplete as ions are produced in the electrolyte 160, 260 by reaction with the supplemental ion source 160, 260. Over a lengthy period of time, a combined intercalation (actual formation of intercalation compounds) and pre-intercalation (a simple gathering of cations around the negative electrode 140, 240) will occur at the negative electrode 140, 240, after which the cell 100 could be charged to complete a slow formation process. The length of time for this to occur could be determined, for example, using a three-terminal test cell including an accessible third terminal for connecting the supplemental ion source 160, 260 to the negative terminal 120, 220 via a sensitive ammeter. The time integral of the measured current could then be used to calculate the number of electrons, which is directly related to the number of moles of ions produced by the supplemental ion source 160, 260, which is directly related to the consumption of the mass of the supplemental ion source 160, 260. When the integrated current indicates that sufficient mass of the supplemental ion source 160, 260 has been depleted to produce the desired mass of intercalation compounds (which may be pre-estimated from the start mass of the negative electrode 140, 240) then the cell may be charged to complete the formation process and then tested to confirm that the energy storage capacity has increased to reflect the additional chemical energy stored in the negative electrode 140, 240 (e.g. higher voltage tolerance and increased capacitance in the case of a capacitor cell 100, or increased specific capacity in the case of a battery cell 200). In this way, the relevant formation time can be established for identically constructed two-terminal cells 100, 200.

The operational flow of FIG. 3 may significantly accelerate the hypothetical slow formation process described above by causing the lithium, potassium, and/or calcium ions to flow first from the supplemental ion source 160, 260 to the positive electrode 130, 230 and then from the positive electrode 130, 230 to the negative electrode 140, 240. In this way, the formation process may take advantage of the low impedance path between the positive electrode 130, 230 and the negative electrode 140, 240. After the cell 100, 200 is filled with the electrolyte 150, 250 in step 330, an electrical connection 10, 20 between the positive terminal 110, 210 and the negative terminal 120, 220 may be used to discharge electric current from the positive electrode 130, 230 to the negative electrode 140, 240 (step 340). As shown in the example of the capacitor cell 100 of FIG. 1A, the negative electrode potential with respect to the electrolyte 150, denoted $\Delta V_{CNE}$, is reduced by the lost charge at the negative electrode 140, causing more ions to flow from the supplemental ion source 160 (i.e. an increase in I2) due to the increased potential difference between the supplemental ion source 160 and the negative electrode 140. At the same time, the positive electrode potential with respect to the electrolyte 150, denoted $\Delta V_{CPE}$, is reduced, causing the lithium, potassium, and/or calcium ions to gather around the positive electrode 130. In the example of the battery cell 200 of FIG. 2A, the negative electrode potential $\Delta V_{CNE}$ may similarly be reduced, causing more ions to flow from the supplemental ion source 260 (i.e. an increase in $I_2$), but in this case the discharge current $I_1$ is controlled to minimize any electrochemical voltage drop of the positive electrode 230 with respect to the electrolyte 150 that may be caused by lithium, potassium, and/or calcium ion intercalation (though some small reduction in the positive electrode potential may still occur).

This discharging of the cell 100, 200 may advantageously be performed before any charging of the cell 100, 200 (e.g. immediately after filling the cell 100, 200 with the electrolyte 150, 250) and, in any event, may be performed prior to the energy storage capacity of the cell 100, 200 reaching the defined value of step 320, i.e. during formation as opposed to during the life of the finished product. It is noted that the energy storage capacity may or may not actually be measured and that it may be presumed that formation is incomplete (e.g. based on the elapsed time from adding the electrolyte 150, 250 or other factors). The discharging may be performed at least in part during a deep discharge state, for example, while the OCV is below the rated minimum. In the case of the capacitor cell 100, the danger associated with deep discharge may be avoided because the formation of the negative electrode 140 has not been completed and cannot be degraded. In the case of the battery cell 200, the discharge current $I_1$ and time may be controlled so as to limit the overall voltage drop as mentioned above while still being sufficient to produce the increase in ion source current $I_2$. There may be a relatively narrow window of safe discharge operation in terms of current $I_1$ and time that has a dependence on the time integral of the ion source current $I_2$.

Following the discharging of the electric current from the positive electrode 130, 230 to the negative electrode 240, 240, the electric current may be reversed to flow from the negative electrode 140, 240 to the positive electrode 130, 230 (step 350 of FIG. 3), for example, by increasing the OCV with a voltage or current applied by the electrical connection 10, 20. In the case of the capacitor cell 100 shown in FIG. 1B, this causes the cations which had gathered around the positive electrode 130 as a result of the discharging of step 340 to be forced to the negative electrode 140 where they may form lithium, potassium, and/or calcium intercalation compounds at an accelerated rate. In the case of the battery cell 200 shown in FIG. 2B, the reversal of electric current to flow from the negative electrode 240 to the positive electrode 230 causes the lithium, potassium, and/or calcium ions that had intercalated into the positive electrode 230 as a result of the discharging of step 340 to be forced to the negative electrode 240 where they may form intercalation compounds at an accelerated rate. As explained above, the formation of the negative electrode 140, 240 of the capacitor or battery cell 100, 200 in this way may take advantage of the very low impedance R_PE_ION and R_NE_ION to ion flow between the positive electrode 130, 230 and the negative electrode 140, 240.

As noted above, the electrical connection 10, 20 may consist of various passive elements such as electrical impedances or active elements like a voltage source, current source, or diode, any or all of which may be capable of being switched or otherwise controlled via the use of switches, relays, or transistors. An example of implementing an electrical connection 10, 20 that consists of passive elements for the discharging of the electric current in step 340 may be to connect the positive terminal 110, 210 to the negative terminal 120, 220 via an electrical impedance in series with a diode oriented to permit current flow from the positive electrode 130, 230 to the negative electrode 140, 240. Considering a lithium ion battery cell 200 by way of example, the electrical impedance may be a 50 Ohm resistor and the diode may be selected to have a forward voltage drop of 1.2 volts, for example. The cell 200 may be left connected to such passive device for twenty-four hours, after which the cell may be disconnected from the device and left disconnected for two days. The electric current may then be reversed in step 350 by connecting the cell 200 to a battery charger, and the cell 200 may be rapidly charged up to the cell maximum voltage. Such particular discharging and charging parameters (e.g. current, time, etc.) may be determined from one or more inputs such as electric potential, current output, ESR, temperature, capacity, and/or capacitance of the cell 100, 200.

The parameters may be established in advance using a test cell under substantially identical conditions (e.g. a three-terminal test cell as in the hypothetical example described above), or the parameters may be modified on a per-cell basis as a result of sensor input of the particular cell. To this end, an example of an electrical connection 10, 20 including active elements may be a switched mode power supply in parallel with a switched resistive load together with various sensors for measuring cell voltage, cell mass, cell temperature, etc. The sensor data may be recorded for a set period, and discharge and charge parameters may be decided based on the sensor data by applying a model such as one developed with deep learning or other machine learning techniques. The model may be tuned to shorten the negative electrode formation process. For example, in a case where a three-terminal test cell is used to measure a current from the supplemental ion source 160, 260 to the negative terminal 120, 220, the model may be tuned to increase the time integral of such test current with respect to elapsed time.

It should be noted that one or both of the discharging and reversing of electric current of steps 340 and 350 may be repeated one or more times, such that the discharging and charging parameters may define a pattern of multiple discharge and/or charge cycles. In this respect, the one or more parameters for discharging and/or reversing the electric current may more generally include, for example, a target OCV, a discharge current, a charge current, a discharge time, a charge time, a number of discharge cycles, and/or a number of charge cycles. As represented in FIG. 3, the example operational flow may thus include controlling the discharging and/or reversing of the electric current (step 360), which may be on the basis of one or more of the above inputs (e.g. electric potential, current output, ESR, temperature, capacity, and/or capacitance of the cell 100, 200). The discharging and/or reversing of the electric current may be controlled according to a machine learning algorithm such as a deep learning algorithm, which may in some cases be wholly or partially embodied in a cloud-based machine learning platform such as Microsoft Azure Machine Leaning, IBM Watson, Google Cloud AI, or Amazon Machine Learning.

By controlling the discharging and/or reversing of the electric current, the disclosed formation process may include varying the target cell OCV or drain current or charge current rates as well as performing drain and/or charge operations either singly or several times to modify cell characteristics or the speed of the formation of the lithium, potassium, and/or calcium intercalation compounds. The target cell OCV, drain current, charge current, charge potential, and/or number and range of operation cycles may be varied based on cell specific characteristic measurements such as OCV, ESR, capacitance, mass, and/or temperature, and machine learning algorithms may be used to develop optimal and/or cell-specific optimal parameters thereof. For example, a model developed with deep learning techniques may use sensor data recorded for a set period to customize a three-cycle voltage-based discharge and charge pattern tailored to a specific cell 100, 200, and the electrical connection 10, 20 may be controlled accordingly to accelerate formation of the negative electrode 140, 240. Following such controlled current discharge and reversing pattern, the cell 100, 200 may be slowly or rapidly charged to maximum rated cell voltage (step 370).

In addition to the formation processes described herein, the disclosed subject matter also encompasses a resulting lithium, potassium, and/or calcium ion capacitor (e.g. an EDLC) that includes a negative electrode 140 that has undergone a manufacturing method in accordance with the disclosed formation processes resulting in the accelerated formation of ion intercalation compounds within the negative electrode 140. Likewise, the disclosed subject matter encompasses a resulting lithium, potassium, and/or calcium ion battery that includes a negative electrode 240 that has undergone a manufacturing method in accordance with the disclosed formation processes resulting in the accelerated formation of ion intercalation compounds within the negative electrode 240. Such capacitor or battery made by the disclosed processes may exhibit superior qualities such as higher energy storage capacity indicative of a fully formed negative electrode at an earlier stage in manufacturing. For example, a capacitor or battery made by the disclosed processes may have a fully formed negative electrode at two hundred forty hours after the cell is filled with electrolyte, whereas a conventional device may have an incompletely formed negative electrode at this stage, making it unusable.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of forming a negative electrode of an energy storage device, the method comprising:
   providing an energy storage device cell, the cell including a negative electrode, a positive electrode, and a supplemental ion source electrically connected to the negative electrode;
   defining a value of an energy storage capacity of the cell, the defined value indicative of the negative electrode being fully formed as a result of intercalation in the negative electrode of an ion provided by the supplemental ion source;
   filling the cell with an organic electrolyte containing a salt composed of the ion;
   prior to the energy storage capacity of the cell reaching the defined value, discharging electric current from the positive electrode to the negative electrode; and,
   thereafter, reversing the electric current to flow from the negative electrode to the positive electrode.

2. The method of claim 1, wherein the energy storage device is a battery.

3. The method of claim 2, wherein the defined value is a capacity measurement value of the cell.

4. The method of claim 1, wherein the energy storage device is a capacitor.

5. The method of claim 4, wherein the defined value is a capacitance measurement value of the cell.

6. The method of claim 1, further comprising repeating the discharging and the reversing of the electric current.

7. The method of claim 1, further comprising determining one or more parameters of the discharging and/or reversing from one or more inputs selected from the group consisting of electric potential of the cell, current output by the cell, equivalent series resistance of the cell, temperature of the cell, capacity of the cell, and capacitance of the cell.

8. The method of claim 7, wherein the one or more parameters include at least one parameter selected from the group consisting of a target open cell voltage, a discharge current, a charge current, a discharge time, a charge time, a number of discharge cycles, and a number of charge cycles.

9. The method of claim 8, wherein the one or more parameters define a pattern of multiple discharge and/or charge cycles.

10. The method of claim 1, further comprising controlling the discharging and/or reversing of the electric current according to a machine learning algorithm.

11. The method of claim 10, wherein the machine learning algorithm determines one or more parameters of the discharging and/or reversing from one or more inputs selected from the group consisting of electric potential of the cell, current output by the cell, equivalent series resistance of the cell, temperature of the cell, capacity of the cell, and capacitance of the cell.

12. The method of claim 11, wherein the one or more parameters include at least one parameter selected from the group consisting of a target open cell voltage, a discharge current, a charge current, a discharge time, a charge time, a number of discharge cycles, and a number of charge cycles.

13. The method of claim 12, wherein the one or more parameters define a pattern of multiple discharge and/or charge cycles.

14. The method of claim 1, wherein the discharging is performed at least in part while an open cell voltage of the cell is below a rated minimum.

15. The method of claim 1, wherein the discharging is performed before any charging of the cell.

16. The method of claim 1, further comprising charging the cell to a maximum rated cell voltage after the discharging and the reversing of the electric current.

17. The method of claim 1, wherein the ion provided by the supplemental ion source includes a lithium ion.

18. The method of claim 1, wherein the ion provided by the supplemental ion source includes a potassium ion.

19. The method of claim 1, wherein the ion provided by the supplemental ion source includes a calcium ion.

20. A method of forming a negative electrode of a lithium ion battery, the method comprising:
   providing a lithium ion battery cell, the cell including a negative electrode, a positive electrode, and a supplemental lithium ion source electrically connected to the negative electrode;
   filling the cell with an organic electrolyte containing a lithium salt;
   prior to a capacity of the cell reaching a value indicative of the negative electrode being fully formed as a result of lithium intercalation, discharging electric current from the positive electrode to the negative electrode; and,
   thereafter, reversing the electric current to flow from the negative electrode to the positive electrode.

21. A method of forming a negative electrode of a lithium ion capacitor, the method comprising:
   providing a lithium ion capacitor cell, the cell including a negative electrode, a positive electrode, and a supplemental lithium ion source electrically connected to the negative electrode;
   filling the cell with an organic electrolyte containing a lithium salt;
   prior to a capacitance of the cell reaching a value indicative of the negative electrode being fully formed as a result of lithium intercalation, discharging electric current from the positive electrode to the negative electrode; and,
   thereafter, reversing the electric current to flow from the negative electrode to the positive electrode.

* * * * *